(12) United States Patent
Weber

(10) Patent No.: US 6,189,144 B1
(45) Date of Patent: Feb. 13, 2001

(54) METHOD OF CONTROLLING A DATA PROCESSING SYSTEM

(75) Inventor: Christian Weber, Poing (DE)

(73) Assignee: Fujitsu Siemens Computers GmbH, Munich (DE)

( * ) Notice: Under 35 U.S.C. 154(b), the term of this patent shall be extended for 0 days.

(21) Appl. No.: 09/465,725

(22) Filed: Dec. 17, 1999

Related U.S. Application Data

(63) Continuation of application No. PCT/DE98/01389, filed on May 20, 1998.

(30) Foreign Application Priority Data

Jun. 17, 1997 (DE) .............................................. 197 25 593

(51) Int. Cl.⁷ .................................................. G06F 9/45
(52) U.S. Cl. ............................ 717/10; 709/332; 707/104
(58) Field of Search ........................... 717/10, 1; 709/332, 709/331; 707/9, 104, 103; 706/50, 59

(56) References Cited

U.S. PATENT DOCUMENTS

| | | | |
|---|---|---|---|
| 5,247,678 | * 9/1993 | Littleton | 709/331 |
| 5,303,332 | * 4/1994 | Kirk et al. | 706/50 |
| 5,339,422 | * 8/1994 | Brender et al. | 717/4 |
| 5,519,866 | * 5/1996 | Lawrence et al. | 717/10 |
| 5,581,769 | 12/1996 | Wallace et al. | 709/315 |
| 5,659,751 | * 8/1997 | Heninger | 709/332 |
| 5,764,947 | * 6/1998 | Murphy et al. | 703/20 |
| 6,029,207 | * 2/2000 | Heninger | 709/331 |

FOREIGN PATENT DOCUMENTS

WO 92/15936  9/1992  (WO) .
WO 92/15962  9/1992  (WO) .

OTHER PUBLICATIONS

Harrold et al. "Separate Computation of Alias Information for Reuse," IEEE Transaction on Software Engineering, vol. 22, Issue 7, pp. 442–460, Jul. 1996.*

* cited by examiner

*Primary Examiner*—Kakali Chaki
*Assistant Examiner*—Tuan Q. Pam
(74) *Attorney, Agent, or Firm*—Herbert L. Lerner; Laurence A. Greenberg; Werner H. Stemer

(57) ABSTRACT

An object program is produced in a data processing system by linking a plurality of program modules. Internal program modules, which have been produced by means of a high-level language translator, and external program modules, are provided with names from mutually exclusive name classes. A matching routine of a first type is produced for each of the internal program modules, and a matching routine of a second type is produced for each of the program modules that are called by the internal program modules. The matching routines bridge different linking declarations.

8 Claims, 9 Drawing Sheets

FIG 6
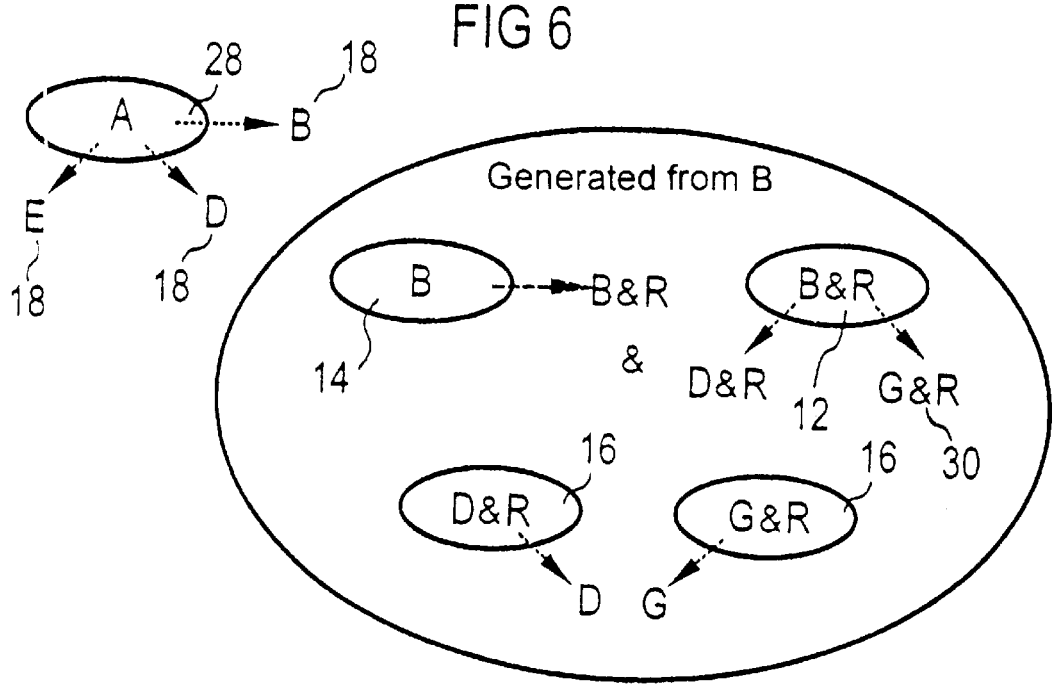
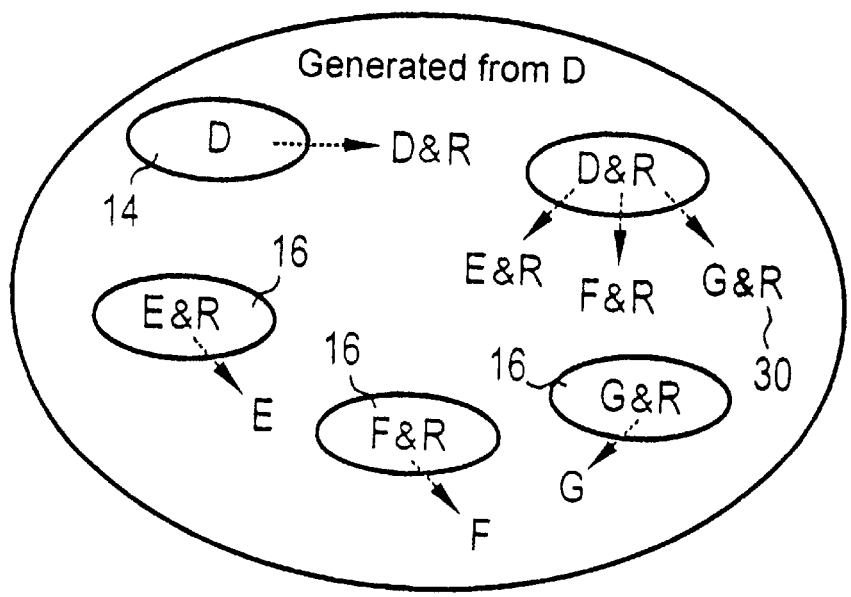
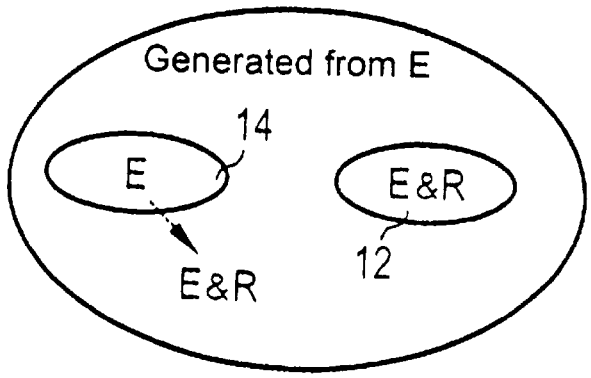

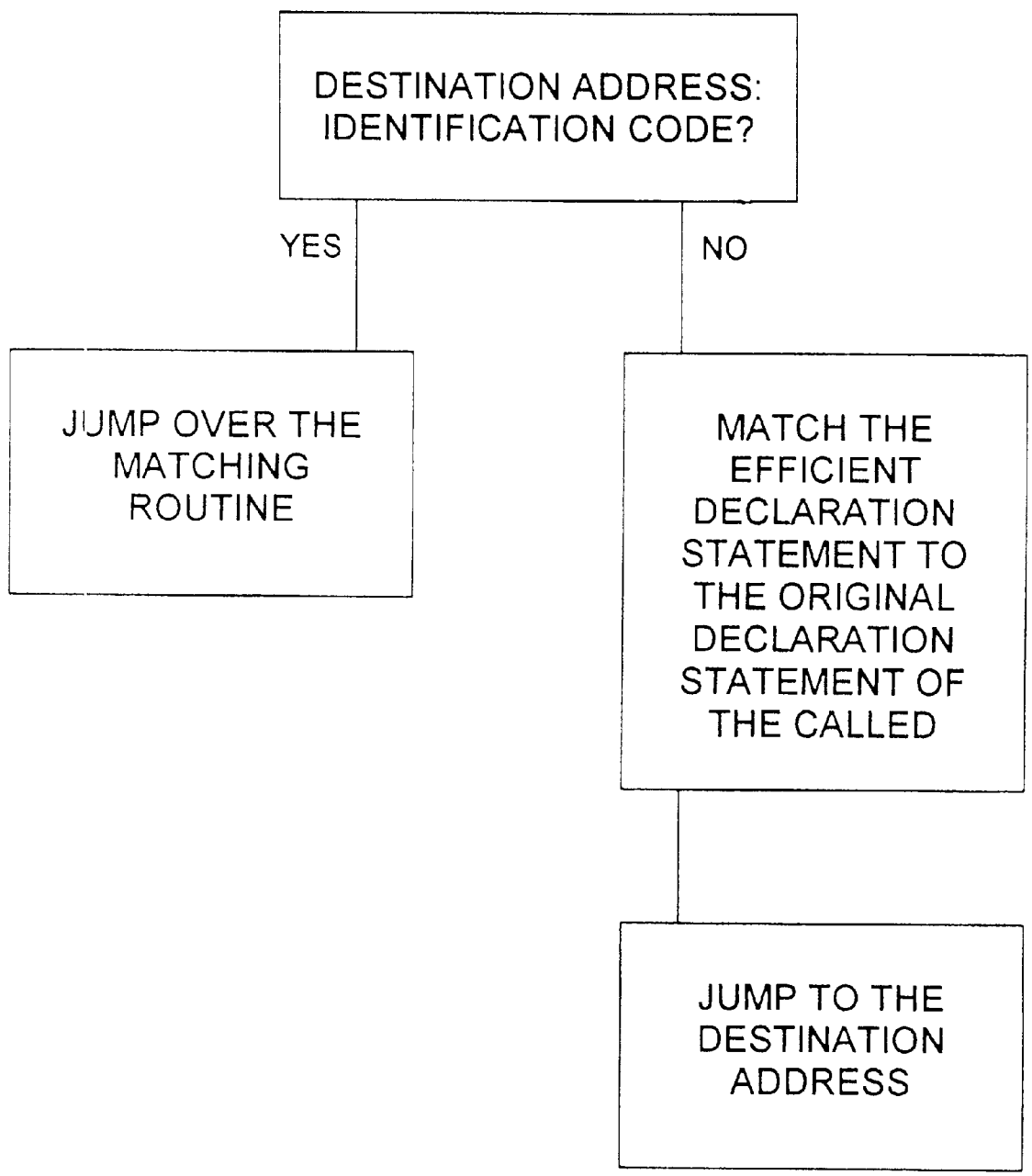

METHOD OF CONTROLLING A DATA PROCESSING SYSTEM

CROSS-REFERENCE TO RELATED APPLICATION

This is a continuation of copending International Application PCT/DE98/01389, filed May 20, 1998, which designated the United States.

BACKGROUND OF THE INVENTION

Field of the Invention

The invention lies in the data processing field. More specifically, the invention relates to a method of controlling a data processing system for producing an object program by linking a plurality of program modules.

When an object program is produced which is formulated in a relatively high-level programming language, for example COBOL, C, C++, Fortran, and the like, it is normal, first of all, to produce individual source text modules, for example procedures and functions, which are translated independently of one another by means of a high-level language translator, also called a compiler, into the machine language. Machine language are lowest level instructions that can be directly "understood" by the computer. The program modules produced in this way are linked to an object program by means of a linker.

When one program module calls another, it is necessary to ensure that the two program modules involved in the call satisfy standard linking declarations, in order to ensure error-free parameter transfer between the calling program module and the called program module. Such linking declarations are, for example, conventions relating to register assignments, data formats etc.

During the translation process, high-level language translators for relatively high-level programming languages automatically produce a standard declaration statement of linking declarations, which is applicable to all program modules. The program developer therefore does not need to be concerned about the linking declaration.

However, the program developer needs to observe these linking declarations as soon as he wishes to link program modules to the object program which have not been produced using the specified high-level language translator, such as program modules which are formulated in an assembler language, referred to for short as assembler modules in the following text. For assembler programming, the linking declarations are programmed by the program developer himself, so that the linking declarations are inseparably included in the assembler module. Such program modules, which cannot be produced by the specified high-level language translator and are inseparably linked to a declaration statement are referred to in the following text as external program modules. The modules produced by the specified high-level language translator, on the other hand, are referred to as internal program modules.

The declaration statement for module links which, at the time when the object program is first produced, has not only been produced by the specified high-level language translator for internal program modules but has also been taken into account in an appropriate manner in external program modules, is referred to as the original declaration statement in the following text.

If the intention is to transfer the object program to a different computer system then, as a rule, it is expedient to use a new declaration statement, which is particularly well matched to the hardware of the new computer system, for module links, in order to avoid seriously adversely affecting the processing speed of the new computer system. This new declaration statement is referred to in the following text as an efficient declaration statement. The efficient declaration statement also has to be used in this case when commercially available collections of program routines for the new computer system—referred to as standard modules in the following text—are intended to be included which, as a rule, are available only for the efficient declaration statement, which is particularly well matched to the hardware. For these reasons, it is desirable to convert the linking statements for the object program to the efficient declaration statement, as far as possible.

The specified high-level language translator could optimally match the internal program modules produced to the new hardware by retranslation of all the source text modules using the efficient declaration statement. However, there would then no longer be any assurance that the internal program modules could be linked to the external program modules, which are rigidly coupled to the original declaration statement.

In order to solve this problem, a method is known in which matching routines are used in order to compensate for the mutually different linking declarations of program modules. In order to match the declaration statements for the calling program module and called program module to one another, the program developer has to produce such a matching routine for all the relevant program modules when using the known method. In this case, it is necessary to know not only the differences in the linking declarations, but also the number and type of parameters transferred during each call, since these are defined individually for each program module. The prior art method is therefore highly complex, and makes portability of the object program to a new computer system difficult.

SUMMARY OF THE INVENTION

It is accordingly an object of the invention to provide a method of controlling a data processor, which overcomes the above-mentioned disadvantages of the heretofore-known devices and methods of this general type and which makes it possible for a high-level language translator to produce the matching routines mentioned above automatically during translation of the program modules, and by means of which the matching routines are automatically linked to the object program when the individual program modules are being linked by a linker.

With the foregoing and other objects in view there is provided, in accordance with the invention, a method of controlling a data processing system for producing an object program by linking a plurality of program modules, which comprises:

naming internal program modules produced by means of a high-level language translator and subject to an efficient declaration statement of linking declarations with names selected from an internal name class;

naming external program modules subject to an original declaration statement of linking declarations with names selected from an external name class, whereby the name classes associated with the respective declaration statements are mutually exclusive;

producing a matching routine of a first type for each of the internal program modules, naming the matching routine of the first type with a name from the external name class corresponding to the name of the associated internal program module and, before calling the associated internal program module, matching with the matching routine of the first type an original declaration statement of the calling external program module to the efficient declaration statement of the internal program module to be called;

calling program modules to be called by the internal program modules with names from the internal name class;

producing a matching routine of a second type for each of the program modules to be called by the internal program modules, naming the matching routine of the second type with a name from the internal name class corresponding to the name of the associated program module, and, before jumping to an external program module, matching the efficient declaration statement with the matching routine of the second type to the original declaration statement of the external program module to be called, whereby the matching routine of the second type is provided with a linking attribute preventing a linking thereof to an object program only when no internal program module exists with the same name; and linking the internal program modules, the external program modules, and the required matching routines of the first type and the second type to one another to form an object program.

In the method according to the invention, internal program modules which are produced by a high-level language translator and are subject to an efficient declaration statement of linking declarations are provided with names from an internal name class. Furthermore, external program modules which are subject to an original declaration statement of linking declarations are provided with names from an external name class, in which case the name classes associated with the respective declaration statements are mutually exclusive. A matching routine of a first type is produced for each of the internal program modules, is provided with a name, which corresponds to the name of the associated internal program module, from the external name class and, before calling the associated internal program module, matches the original declaration statement of the calling external program module to the efficient declaration statement of the internal program module to be called. Furthermore, program modules are called from the internal program modules using names from the internal name class. A matching routine of a second type is produced for each of the program modules which is to be called by the internal program modules, is provided with a name, which corresponds to the name of the associated program module, from the internal name class and, before jumping to the corresponding external program module matches the efficient declaration statement to the original declaration statement of the external program module to be called, in which case the matching routine of the second type is provided with a linking attribute, so that it is linked to an object program only when, apart from it, there is no internal program module with the same name. Furthermore, the internal program modules, the external program modules and the required matching routines of the first and second types are linked to one another to form the object program.

The measure of providing the internal and external program modules with names from mutually exclusive name classes makes it possible for the linker to identify the declaration statement to which it should assign the respective program module to be linked, so that accidental linking of program modules which are subject to different linking declarations can reliably be prevented. During the process of translating the internal program modules, the high-level language translator can in each case automatically produce a matching routine of the first type, since the high-level language translator knows the information which is essential for this purpose, namely the number and the type of parameters used in the internal program module produced. The external program modules are called by the internal program modules via the matching routines of the second type, which are provided with names from the internal name class and jump to the associated external program module. In this way, the matching routines of the second type which are required for matching the different declaration statements are automatically linked to the object program for the external program modules which are called by the internal program modules. Since the matching routines of the second type are provided with suitable linking attributes, they are linked and passed through only for those calls for which it is necessary to match the efficient declaration statement to the original declaration statement.

In the above-outlined process, the matching routines are automatically produced by the high-level language translator during the translation process, and they are linked to the object program by the linker. Finally, they are called during the processing of the object program. In particular, there is no need for the program developer to produce the matching routines. The invention makes it possible for the internal and external program modules to be correctly linked via the original declaration statement, if this is necessary. The external program modules may be assembler modules or program modules which have been produced by a different high-level language translator and are subject to the linking declarations of the original declaration statement. The internal program modules produced by the specified high-level language translator can be linked to one another via the efficient declaration statement, thus increasing the processing speed of the object program.

In accordance with an added feature of the invention, the names of the internal program modules are produced by attaching a character sequence which is not allowed as a name component in the high-level language used, to the names of the source text modules on which the internal program modules are based. This allows the name classes of the internal and external program modules to be separated without any special adaptations to the linker. For example, the name component may thus contain a character which is not envisaged as name component in the specified relatively high-level programming language. One such character or character string, for example, is the ampersand character. The name classes are thus reliably separated from one another without the names of the external program modules having to be changed.

If the calling program module calls another program module via its address rather than via its name, it is advantageously presupposed that the name of the called program module is assigned to the external name class. For a call of a program module using its address—referred to as an indirect call in the following text—it is thus advantageously assumed that the name of the called program module is included in the external name class. Furthermore, the matching routines of the first type for the called internal program modules are used to find the declaration statement to which the respective calling program module is subject, and the matching of the declaration statements is carried out only if the declaration statements of the calling and called program modules differ from one another. This measure makes it possible, inter alia, for the internal program modules produced by the high-level language translator also to be called up by standard modules which are subject to the efficient declaration statement, for example by library routines, via their address.

In accordance with an additional development of the invention, the matching routines of the first type are each provided with an identification code, by means of which they and the external program modules can be distinguished form one another. For an indirect call, the calling internal program module checks whether the identification code is stored at the address of the called program module, and matching of the mutually different declaration statements of the calling and called program modules is carried out only if no identification code is stored at that address. This method step allows external program modules which have no matching routine of the second type to be called from the internal program modules produced by the high-level language translator, via their addresses.

According to the invention, a standard module which is in the form of machine language and is subject to the efficient declaration statement is advantageously supplemented by the identification code. In addition to the original name from the internal name class, the standard module is given a further name from the external name class. In this way, the standard module can also be called indirectly, that is to say via its address.

The above-outlined measures for indirect calls barely impede the more frequently occurring direct calls, that is to say those calls which use the names of the program modules.

Other features which are considered as characteristic for the invention are set forth in the appended claims.

Although the invention is illustrated and described herein as embodied in a method of controlling a data processing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a schematic diagram of the program modules produced and matching routines in the object program of FIG. 5;

FIG. 9 is a diagram illustrating the matching of the declaration statement of the calling program module for an indirect module call;

DESCRIPTION OF THE PREFERRED EMBODIMENTS

Figure 1:
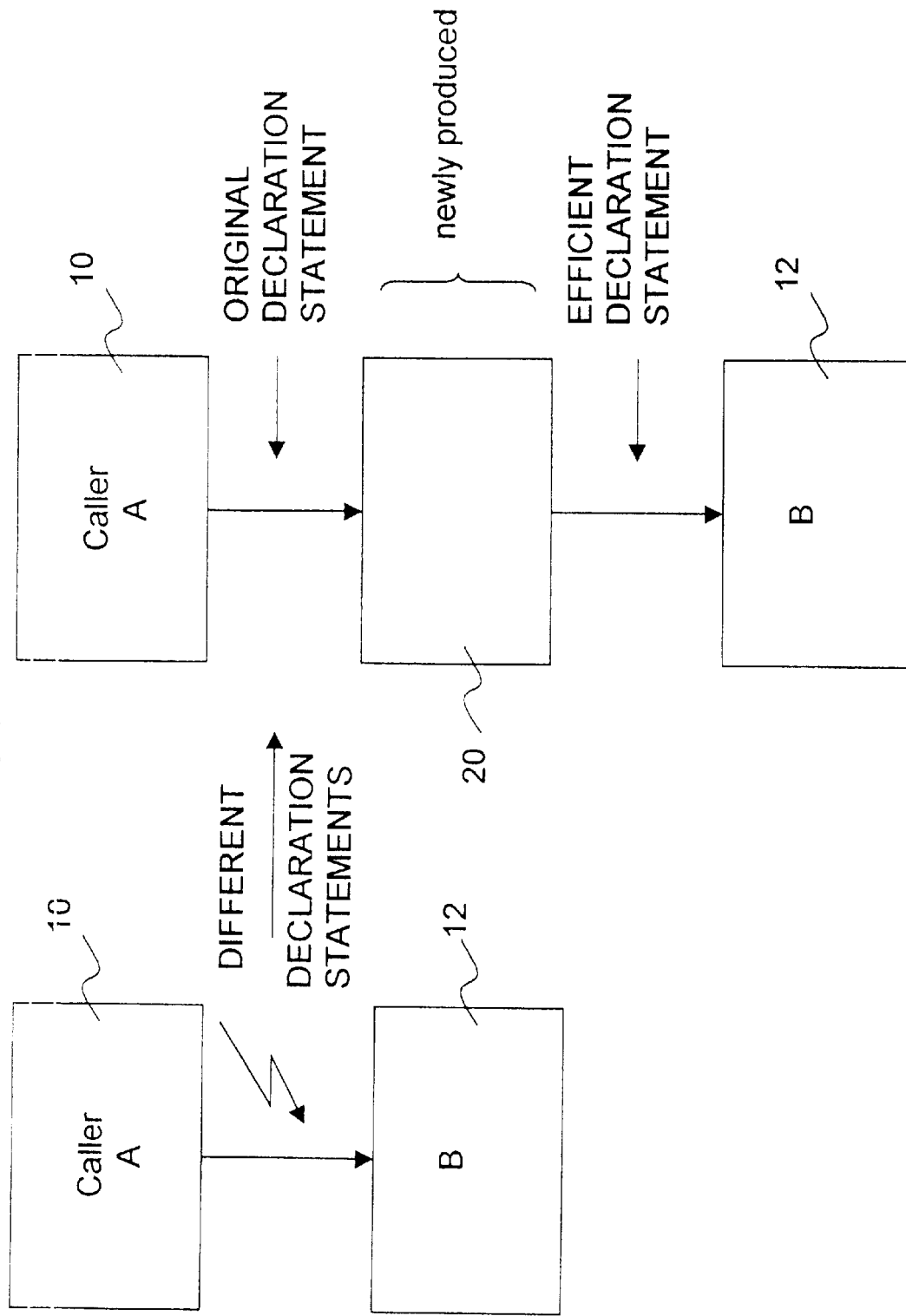
FIG. 1 is a schematic diagram of a prior art method for matching the declaration statements.

Structurally and functionally identical parts are identified with the same reference numerals throughout the figures. In particular, external program modules are denoted by the reference numeral 10, internal program modules are denoted by 12, matching routines of the first and second types, respectively, are denoted by 14 and 16, respectively, and source text modules which are written in a high-level language and on which the program modules that can be run are based are identified with the reference numeral 18.

Referring now to the figures of the drawing in detail and first, particularly, to FIG. 1 thereof, there is seen a prior art process for matching declaration statements. An external program module 10 with the name A, which is subject to an original declaration statement of linking declarations, is intended to be linked to an internal program module 12 with the name B, for which an efficient declaration statement of linking declarations is provided. The two declaration statements differ from one another if, for example, the internal program module 12 with the name B is produced by means of a high-level language translator, and the external program module 10 with the name A is an assembler module or has been produced by means of a high-level language translator, which is not compatible with the specified high-level language translator, for another relatively high-level programming language. Feasible high-level language translators are those which translate source text modules written in relatively high-level programming languages such as COBOL, C, C++, Fortran, and the like, into a machine language, and thus produce program modules which can be run. In the prior method, a program developer has to produce a matching routine 20 in order to bridge the mutually different linking declarations of the external program module 10 with the name A, and of the internal program module 12 with the name B. When a linker links the two program modules 10, 12, the matching routine 20 is also included in order to carry out the matching of the mutually different linking declarations when the internal program module 12 with the name B is called by the external program module 10 with the name A. In the prior method, the program developer has to produce such a matching routine 20 for each module which is intended to be called by a program module with a different declaration statement.

Figure 2:
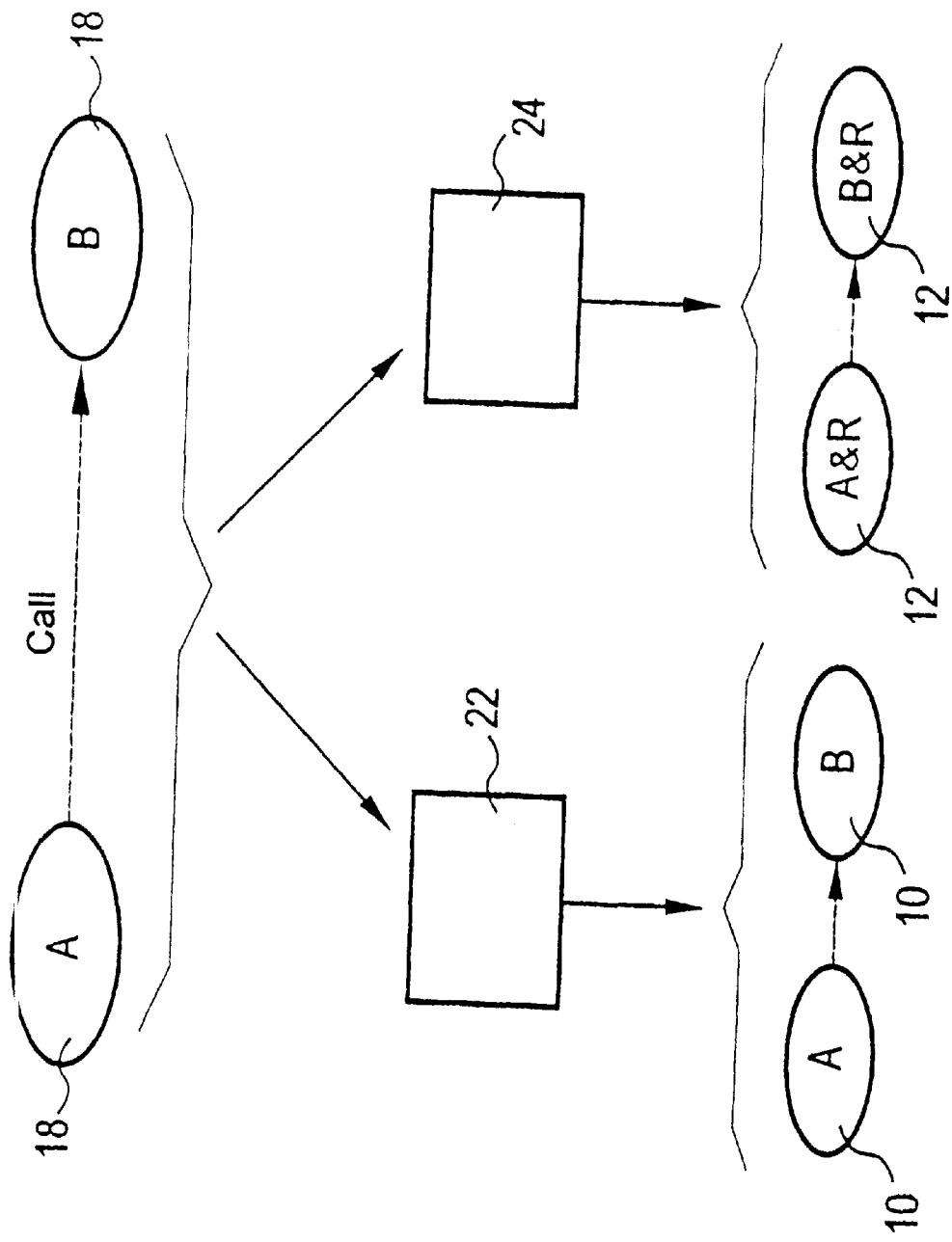
FIG. 2 is a schematic diagram illustrating the separation of the name classes.

Referring now to FIG. 2, in the method according to the invention, mutually separated name classes are assigned to the different declaration statements. Source text modules 18 written in the specified high-level language and having the names A and B are translated both by a high-level language translator 22 in accordance with the original declaration statement, and by a high-level language translator 24 in accordance with the efficient declaration statement. It is now found that the names of the external program modules 10 produced by the high-level language translator 22 remain unchanged from the names of the basic source text modules 18, namely A and B. In contrast to this, the character sequence "&R" is attached to the names of the internal program modules 12 produced by the high-level language translator 24. The ampersand character "&" in the character sequence "&R" is not allowed as a name component of a source text module in any relatively high-level programming language, so that the names of the internal program modules 12 form a name class which reliably excludes the names of the external program modules 10. The external program modules 10 and the internal program modules 12 are thus assigned names from mutually exclusive name classes, which allow identification of the declaration statement associated with the respective program modules. In the example shown in FIG. 2, the external program modules 10 have been produced by the high-level language translator 22. The external program modules 10 may, however, equally well be assembler modules or program modules in a machine language, which are subject to the linking declarations of the original declaration statement.

Figure 3:
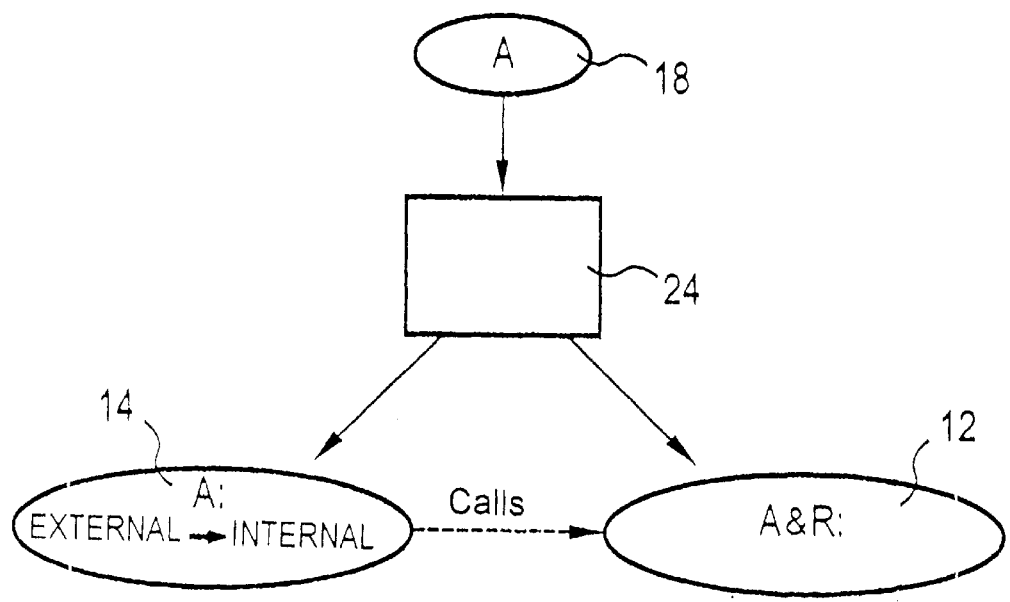
FIG. 3 is a schematic diagram illustrating the method of operation of the matching routine of the first type.

Reference is now had to FIG. 3, which explains the method of operation of a matching routine of the first type. The high-level language translator 24 uses the source text module 18 with name A to produce the internal program module 12 with the name A&R. The internal program module 12 thereby satisfies the linking declarations of the efficient declaration statement. In addition, the high-level language translator 24 produces a matching routine 14 of the first type, which is given the same name A as the source text module 18. The name A of the matching routine 14 is assigned to the name class associated with the original declaration statement, that is to say the external name class. The matching routine 14 to be called by the name A matches the original declaration statement to the efficient declaration statement, and calls the internal program module 12 which has the name A&R. The matching routine 14 of the first type can be produced automatically by the high-level language translator 24, since the translator knows the number and type of parameters in the internal program module 12 produced.

Figure 4:
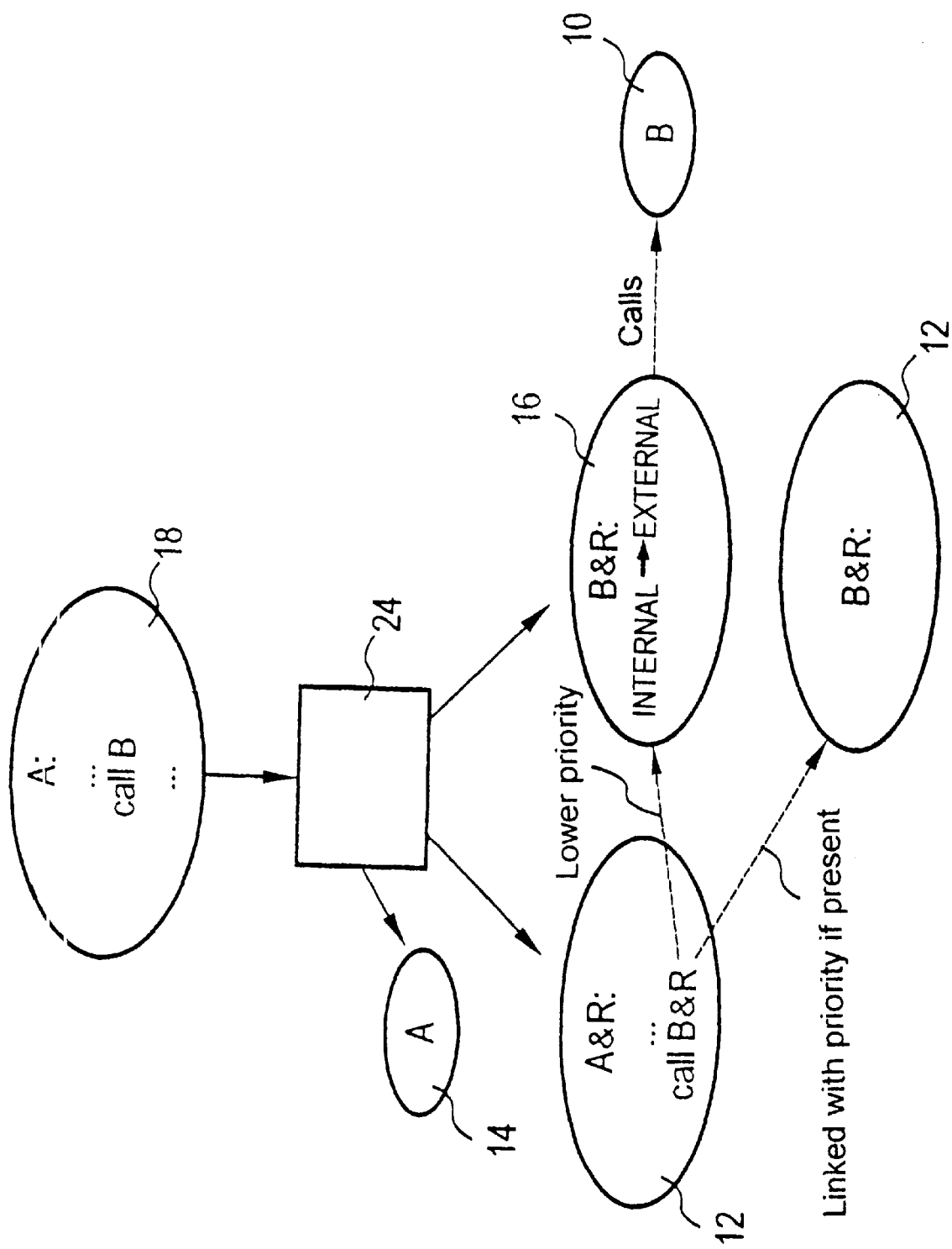
FIG. 4 is a schematic diagram illustrating the method of operation of the matching routine of the second type.

Reference is now had to FIG. 4, which explains the method of operation of a matching routine 16 of the second type. A program instruction "call B" is provided in the source text module 18 with the name A, by means of which a further source text module with the name B is called. The high-level language translator 24 uses the source text module 18 with the name A to produce the matching routine 14 of the first type, as explained in FIG. 3, likewise with the name A, and the internal program module 12 with the name A&R. The internal program module 12 calls each program module in principle in accordance with the efficient declaration statement and using the name defined for the efficient declaration statement. Thus, in the exemplary embodiment, the internal program module A&R calls the program module with the name B&R. A matching routine 16 of the second type is produced for each program module called by the internal program module 12, and is able to match the efficient declaration statement to the original declaration statement. The matching routine 16 of the second type is in this case given a name from the name class associated with the efficient declaration statement (i.e., the internal name class). In the exemplary embodiment shown in FIG. 4, the high-level language translator 24 thus produces the matching routine 16 of the second type with the name B&R. The matching routine 16 with the name B&R is also provided with a linking attribute, which causes the linker to link the matching routine 16 only when there is no internal program module with the name B&R. If no such internal program module arrives at the linker, then it links the matching routine 16, which carries out the necessary matching of the declaration statements, and then calls the external program module 10 with the name B.

The process measures explained above with reference to FIGS. 2 to 4 allow individual program modules that are subject to different declaration statements to be linked by the linker to form an object program, without the program developer having to produce the matching routines.

The interaction of the above outlined process measures will be explained in the following text with reference to the exemplary embodiment illustrated in FIGS. 5 to 8.

Figure 5:
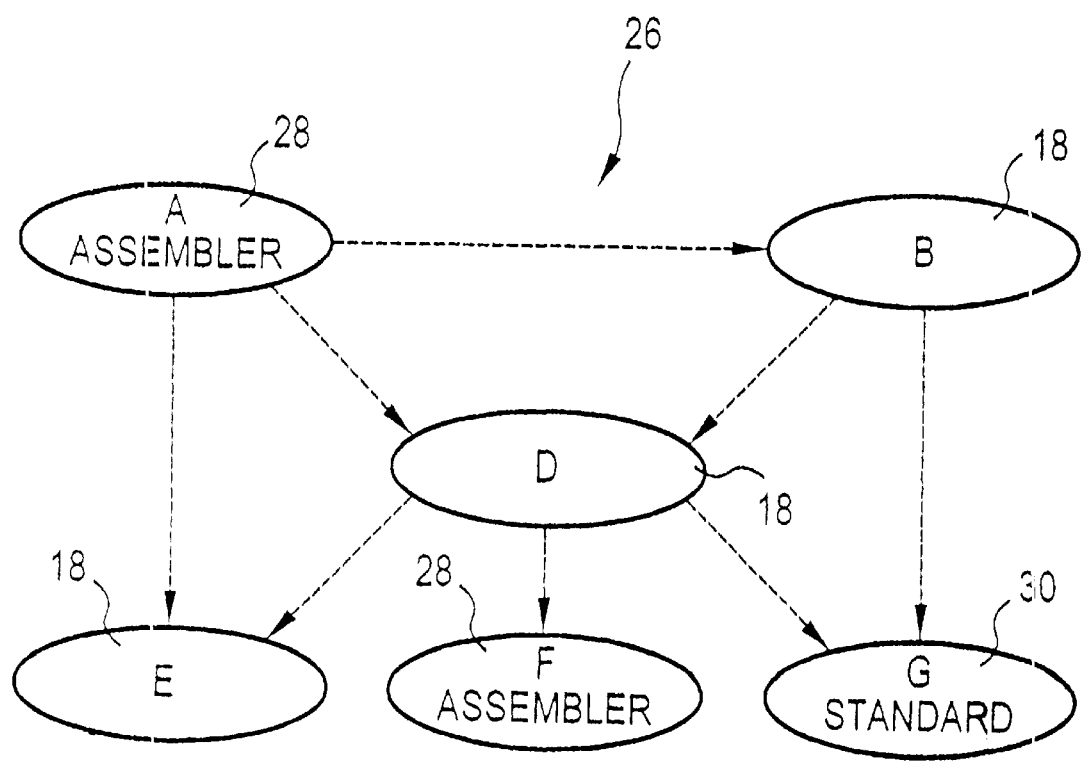
FIG. 5 is a schematic diagram of the call relationships in the object program.

FIG. 5 shows the program modules, which are to be linked to form an object program 26, and the call relationships between these program modules. The object program 26 comprises assembler modules 28 with the names A and F, which are subject to the original declaration statement, the source text modules 18 with the names B, D, E, which are written in the high-level language and are subject to the efficient declaration statement, and a standard module 30 with the name G, which is likewise subject to the efficient declaration statement. The object program 26 provides for the assembler module A to call the source text modules B, D, E. The source text module D and the standard module G are in turn called by the source text module B. Finally, the source text module D calls the source text module E, the assembler module F and the standard module G.

FIG. 6 shows the program modules produced by the high-level language translator 24, and the matching routines for the object program shown in FIG. 5. The corresponding internal program modules 12 with the names B&R, D&R, E&R are produced during translation of the source text modules 18 (see FIG. 5) with the names B, D, E. Furthermore, the high-level language translator 24 produces the matching routines 14 of the first type with the names B, D, E. The internal program modules 12 call further program modules with the names from the internal name class. The internal program module B&R thus calls the standard module 30 with the name G&R as well as the internal program module D&R. The internal program module 12 with the name D&R likewise calls the standard module 30 with the name G&R, the assembler module 28 with the name F&R as well as the internal program module E&R. It should be mentioned that the standard module 30, which is subject to the efficient declaration statement, must be provided with the name G&R if it does not already have this name. This can easily be achieved via a renaming process, which can be carried out automatically.

Finally, the high-level language translator 24 produces the corresponding matching routines 16 of the second type, which are provided with the linking attributes, for those program modules which are called by the internal program modules 12. For the internal program module B&R, these are the matching routines 16 with the names D&R and G&R. The matching routines 16 with the names G&R, F&R and G&R are produced in a corresponding manner for the internal program module 12 with the name D&R. As can be seen from FIG. 6, the matching routines can be produced more than once, by different translation processes. Thus, for example, the matching routine 16 with the name G&R is produced both during the translation of the source text module B and during the translation of the source text module D.

Figure 7:
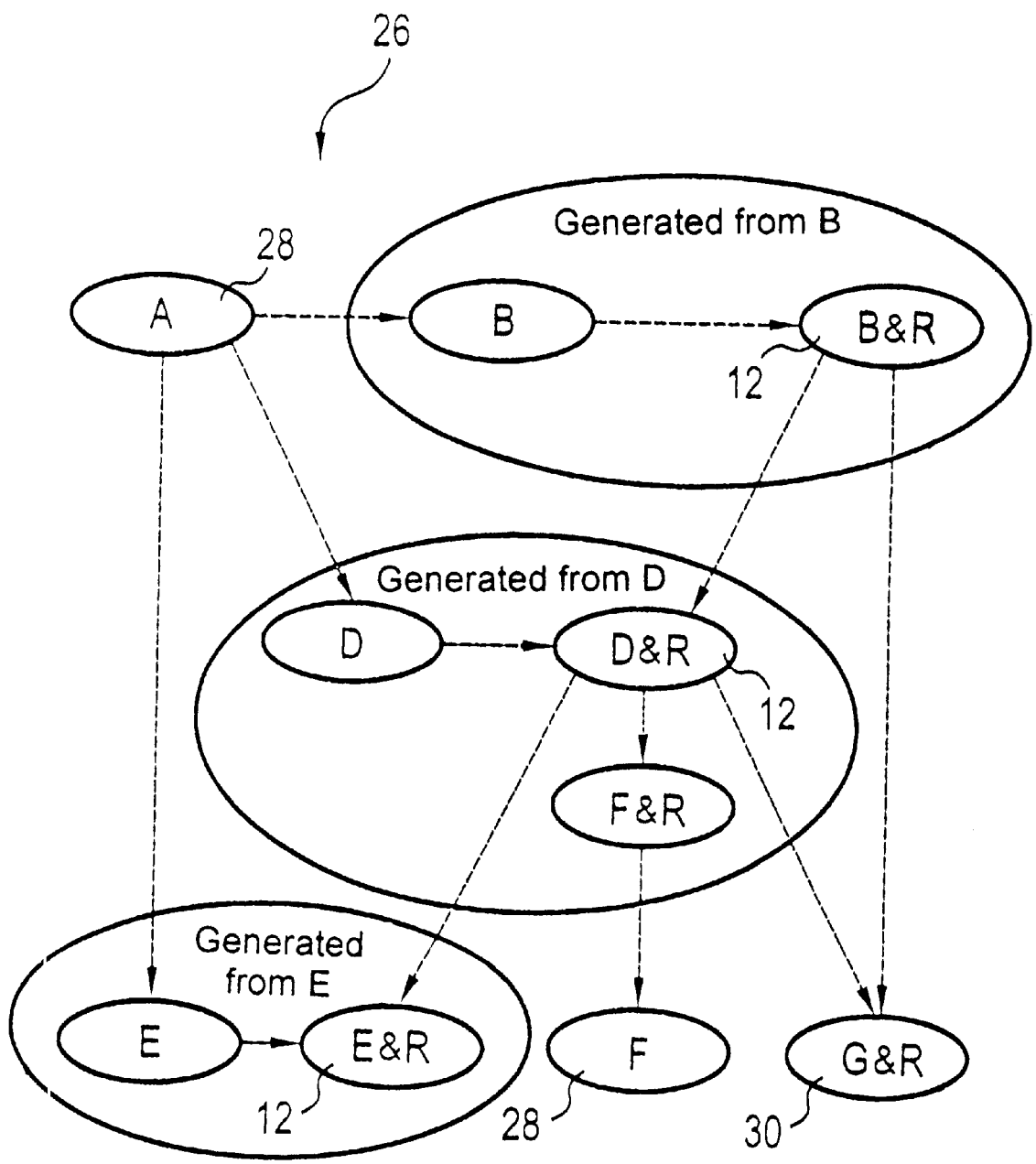
FIG. 7 is a schematic diagram of the object program of FIG. 5, which is produced by the linker and can be run.

Finally, FIG. 7 shows the object program 26 which is produced by the linker. The object program 26 can be executed and it is created by linking the individual program modules. This once again shows how the internal program modules B&R, D&R, E&R are called from the assembler module 28 with the name A via the names B, D and E. In a corresponding manner, the assembler module 28 with the name F is called by the internal program module 12 with the name D&R via the matching routine with the name F&R. In contrast to this, the internal program module 12 with the name B&R calls the internal program module 12 with the name G&R without the interposition of any matching routine, since no declaration statement matching is required for this call.

In some relatively high-level programming languages, for example the language C, it is possible to call a program module not only via its name but also via its address, called the destination address in the following text, that is to say via a "function pointer" to its destination address. The calling program module thus no longer knows the name of the program module being called, but only its destination address. For these indirect module calls, the method described above, which is based on the separation of the name classes on which the various declaration statements are based, needs to be modified somewhat. This modification will be explained in the following text with reference to FIGS. 8 to 10.

Figure 8:
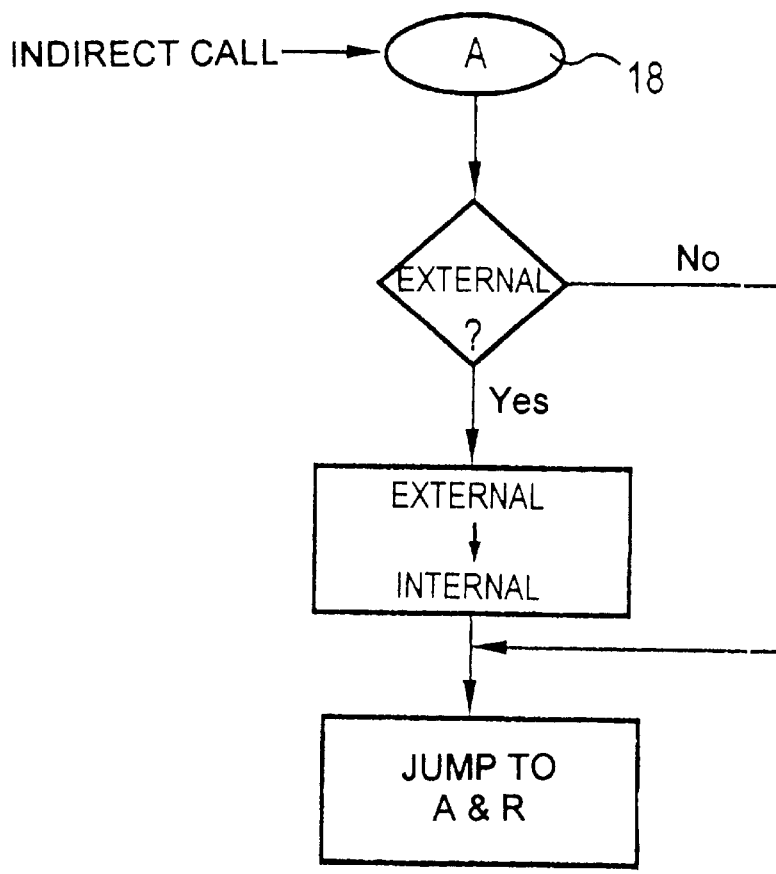
FIG. 8 is a flowchart of the modified matching routine of the first type for an indirect module call.

The flowchart of FIG. 8 outlines a modified matching routine of the first type for an indirect module call. To begin with, it is assumed that the function pointer always points at a variant of the program module which is subject to the initial declaration statement. The indirect call in FIG. 8 is thus made to the routine with the name A. The matching routine of the first type is then modified such that it uses a question to determine the declaration statement to which the calling program module is subject. The matching routine according to FIG. 8 runs through the query whether the call is being made in accordance with the original declaration statement. If this is not the case—that is to say the indirect call is made in accordance with the efficient declaration statement—then no declaration statement matching takes place, and the program module with the name A&R is called. If the modified matching routine of the first type finds that the calling program module is subject to the original declaration statement, then this declaration statement is converted to the efficient declaration statement before the program module A&R is called.

The way in which a criterion for detecting the declaration statement in accordance with which the indirect call is made can be defined depends on the specific linking declarations. For example, it is possible to define as a criterion a register which is not used in the original declaration statement but which, for the efficient declaration statement, is always filled with a valid instruction address, in that this is set in a defined manner to a predetermined invalid instruction address for routines using the original declaration statement.

The modification of the matching routine of the first type explained in FIG. 8 allows those internal program modules which are produced by the high-level language translator to be called in addition from standard modules that are subject to the efficient declaration statement, for example, library routines via function pointers.

The matching routines of the first type need to be modified further in order to allow indirect calls from internal program modules to external program modules which have no matching routines. The matching routines of the first type are thus preceded by an identification code, which identifies the matching routine as such. A specific blank instruction, which is otherwise not used for the production of a machine code, may be used, for example, as the identification code. When an indirect call is made via the destination address of the program module to be called, a check is carried out to determine whether the identification code is stored at the destination address, as is illustrated in FIG. 9. If this is the case, that is to say if the function pointer points at a matching routine of the first type, then this is jumped over, since the program routine to be called is also subject to the efficient declaration statement, and there is thus no need for matching of the declaration statements. If the identification code is not found at the destination address, this means that an external program module with the original declaration statement is intended to be called via the function pointer. In this case, the efficient declaration statement of the calling program module is converted to the original declaration statement of the program module to be called, and the program jumps to the destination address.

Figure 10:
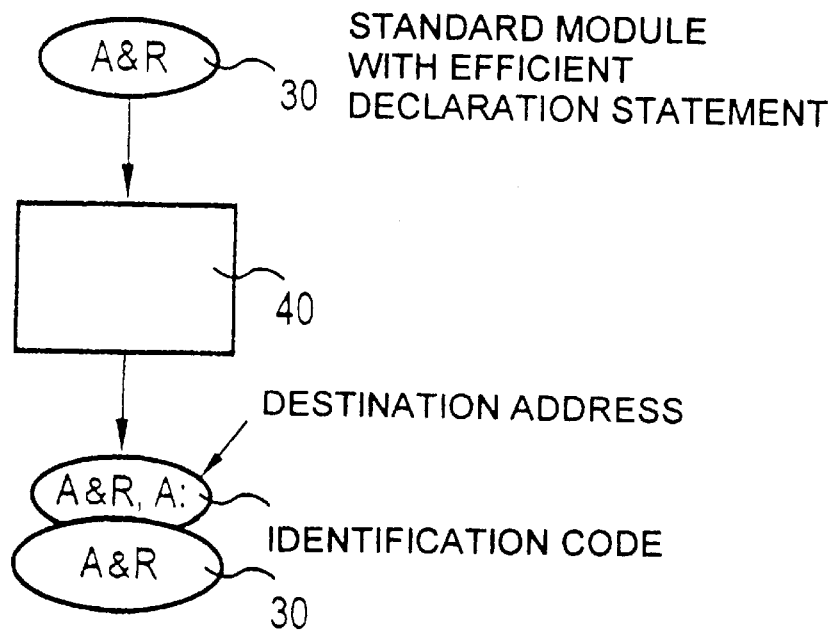
FIG. 10 is a diagram illustrating how a standard module can be modified for indirect module calls.

Referring now to FIG. 10, there is shown how the standard module 30 with the efficient declaration statement can be modified in order to allow indirect module calls with function pointers. The standard module 30 with the name A&R is provided, by means of an auxiliary program 40, with the identification code explained in FIG. 9. Furthermore, in addition to the name A&R, the standard module 30 is given the name A, which is associated with the original declaration statement. In the case of an indirect module call on the standard module 30, the identification code is now found in advance of the destination address so that, as explained in FIG. 9, an indirect call to the standard module 30 can be made from the internal program module, without any need for matching of the declaration statements.

The interaction between the measures explained in FIGS. 8 to 10 allows indirect module calls via function pointers between:

internal program modules which are produced by the high-level language translator 24;

internal program modules which are produced by the high-level language translator 24 and external program modules which are subject to the original declaration statement, for example assembler modules; and internal program modules which are produced by the high-level language translator and standard modules which are subject to the efficient declaration statement, for example library routines.

This may be illustrated, in summary form, according to the following table:

| Caller type | Type being called | | |
| --- | --- | --- | --- |
| | I | II | III |
| I | + | + | − |
| II | + | + | + |
| III | − | + | + |

Figure 11:
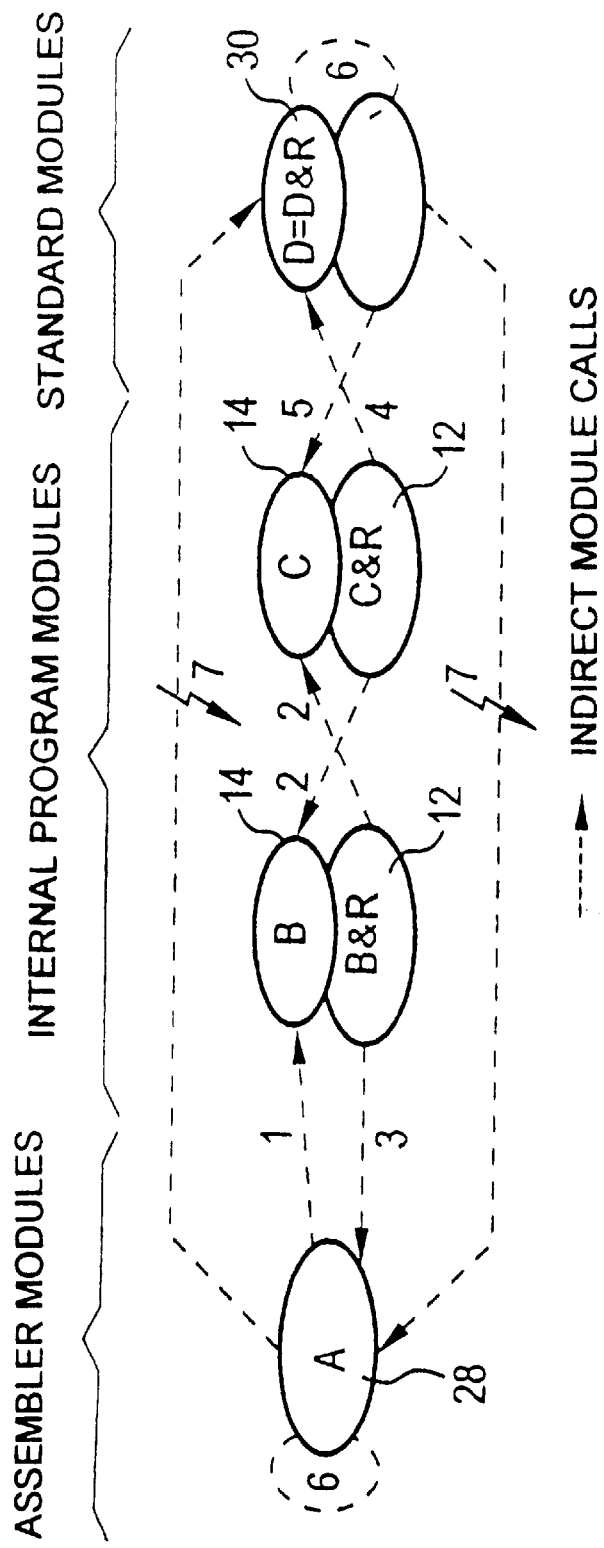
FIG. 11 is a diagrammatic overview of the matching processes for an indirect module call.

Legend:
I. External program module, assembler module with original declaration statement
II: Internal program module with efficient declaration statement
III: Standard module with efficient declaration statement
+: Allowed
−: Not allowed Referring now to FIG. 11, there is provided an overview of the declaration statement matching operations carried out for indirect module calls.

The illustration shows the assembler module 28 with the name A, the internal program module 12 produced by the high-level language translator 24 and having the name B&R, and the matching routine 14 of the first type associated with this and having the name B, the internal program module 12 produced by the high-level language translator 24 and having the name C&R, and the matching routine 14 of the first type associated with this and having the name C, as well as the standard module 30, which exists not only with the name D, but also with the name D&R.

In the case of the indirect module call 1, the matching of the declaration statements is carried out by the matching routine 14 with the name B. No matching takes place for the calls 2, since the calling program modules 12 with the names B&R, C&R recognize the identification code of the matching routines 14 with the names B and C, respectively, and a jump is made, as shown in FIG. 9. In the case of the call 3, the identification code is not initially found in the assembler module 28 with the name A, so that the matching of the declaration statements is carried out in the calling program module 12 with the name B&R. In the case of call 4, the calling program module 12 with the name C&R recognizes the identification code, as with call 2, and jumps, as is illustrated in FIG. 9, without any matching of the declaration statements having to be carried out. No matching of the declaration statements is carried out for call 5, either, since the called matching routine 14 with the name C calls the internal program module 12 with the name C&R, and no matching of the declaration statements is required for the standard module 30 with the name D&R or the internal program module 12 with the name C&R. 6 is used to denote calls between program modules which are subject to the same declaration statement from the start, so that no matching of the declaration statements is required in this case either. Finally, 7 denotes indirect calls between the assembler module 28 with the name A and the standard module 30 with the name D or D&R, which are forbidden in the method according to the invention.

I claim:

1. A method of controlling a data processing system for producing an object program by linking a plurality of program modules, which comprises:

naming internal program modules produced by means of a high-level language translator and subject to an efficient declaration statement of linking declarations with names selected from an internal name class;

naming external program modules subject to an original declaration statement of linking declarations with names selected from an external name class, whereby the name classes associated with the respective declaration statements are mutually exclusive;

producing a matching routine of a first type for each of the internal program modules, naming the matching routine of the first type with a name from the external name class corresponding to the name of the associated internal program module and, before calling the associated internal program module, matching with the matching routine of the first type an original declaration statement of the calling external program module to the efficient declaration statement of the internal program module to be called;

calling program modules to be called by the internal program modules with names from the internal name class;

producing a matching routine of a second type for each of the program modules to be called by the internal program modules, naming the matching routine of the second type with a name from the internal name class corresponding to the name of the associated program module, and, before jumping to an external program module, matching the efficient declaration statement with the matching routine of the second type to the original declaration statement of the external program module to be called, whereby the matching routine of the second type is provided with a linking attribute preventing a linking thereof to an object program only when no internal program module exists with the same name; and linking the internal program modules, the external program modules, and the required matching routines of the first type and the second type to one another to form an object program.

2. The method according to claim 1, which comprises writing the external program modules in an assembler language.

3. The method according to claim 1, which comprises writing the external program modules in machine language.

4. The method according to claim 1, which comprises producing the names of the internal program modules by attaching a character sequence that is not allowed as a name component in the high-level language used, to the names of the source text modules on which the internal program modules are based.

5. The method according to claim 1, which comprises, if the calling program module calls another program module via an address instead of via the name, presupposing that the name of the called program module is assigned to the external name class, and using the matching routines of the first type for the called internal program modules to find the declaration statement to which the respective calling program module is subject, and matching the declaration statements only if the declaration statements of the calling and called program modules differ from one another.

6. The method according to claim 5, which comprises providing each of the matching routines of the first type with an identification code, for distinguishing the matching routines of the first type from the external program modules.

7. The method according to claim 6, which comprises, when an indirect call takes place, carrying out a check to determine whether the identification code is stored at the address of the called program module, and matching the mutually different declaration statements of the calling and called program modules only if no identification code is stored at the address.

8. The method according to claim 7, which comprises supplementing a standard module written in machine language and subject to the efficient declaration statement by the identification code and providing the standard module, in addition to the original name from the internal name class, with a further name from the external name class.

* * * * *